(12) United States Patent
Rauta et al.

(10) Patent No.: US 8,929,057 B2
(45) Date of Patent: Jan. 6, 2015

(54) COVER MECHANISM FOR CASING

(75) Inventors: Visa Rauta, Hyvinkää (FI); Hannu Onnela, Oulunsalo (FI)

(73) Assignee: Polar Electro Oy, Kempele (FI)

( * ) Notice: Subject to any disclaimer, the term of this patent is extended or adjusted under 35 U.S.C. 154(b) by 668 days.

(21) Appl. No.: 13/115,493

(22) Filed: May 25, 2011

(65) Prior Publication Data

US 2012/0298536 A1 Nov. 29, 2012

(51) Int. Cl.
*H05K 7/20* (2006.01)
*H04B 1/38* (2006.01)
*G06F 1/16* (2006.01)
*B65D 85/38* (2006.01)

(52) U.S. Cl.
CPC ............ *H04B 1/3888* (2013.01); *G06F 1/1656* (2013.01); *B65D 85/38* (2013.01)
USPC ................... 361/679.01; 206/301; 312/223.1

(58) Field of Classification Search
CPC ........ G04B 39/02; G04B 39/00; G04B 3/043; G04B 37/081; G04B 37/083; G04B 37/113; G04B 37/22; G04B 37/221; G04B 45/0084; G04B 45/04; B65D 85/38; B65D 83/0463; B65D 1/0223; B65D 1/34; B65D 21/0219; B65D 2203/02; B65D 2207/00; B65D 23/14; B65D 2517/0049; B65D 2543/00194; B65D 2543/00296; B65D 2543/00425; B65D 2543/00509; B65D 2543/00537; B65D 2543/00555; B65D 2543/0062; B65D 2543/00694; B65D 2543/00731; B65D 2543/00805; B65D 2543/00842; B65D 25/48; B65D 43/021; B65D 77/208; B65D 81/2076; B65D 81/365; G06F 1/1656; G06F 19/3468; G06F 1/1603; G06F 1/1626; G06F 1/1658; G06F 1/203; G06F 17/0092; H04B 1/3888; B01L 2200/025; B29C 65/00; A47G 19/027; C23F 13/10; F21L 7/00; F21V 33/00; F21Y 2101/02; G05D 23/121; H01M 2/08; H01M 2/0222; H01M 2/0413; H01M 2/06; H01M 2/1044; H01M 2/30; H01M 6/04; A45D 33/006; A63B 57/006; B26D 3/008; B29L 2031/7128; B60Q 1/54; B63C 11/02; B63C 1/00293; B81C 2203/0145; F04B 43/12; G04C 10/00; H05K 1/0243; H05K 2201/10075; H05K 2201/10371; H05K 7/20445; H05K 7/20509; Y10S 206/811
USPC ............ 361/679.01, 679.02, 679.55, 679.56, 361/679.58, 679.4, 679.31; 312/223.1–223.2; 206/301, 320, 305
See application file for complete search history.

(56) References Cited

U.S. PATENT DOCUMENTS

| | | | | |
|---|---|---|---|---|
| 4,064,552 A | * | 12/1977 | Angelucci et al. | 361/795 |
| 4,810,208 A | * | 3/1989 | Hayes et al. | 439/589 |
| 6,491,177 B1 | * | 12/2002 | Hyobu | 220/4.01 |
| 6,825,777 B2 | * | 11/2004 | Vock et al. | 340/870.05 |
| 2009/0294308 A1 | * | 12/2009 | Zhou | 206/216 |
| 2011/0058332 A1 | * | 3/2011 | Skillman et al. | 361/679.58 |
| 2011/0236629 A1 | * | 9/2011 | Chipping | 428/138 |
| 2011/0273819 A1 | * | 11/2011 | Sokola et al. | 361/679.01 |

* cited by examiner

*Primary Examiner* — Anthony Haughton
*Assistant Examiner* — Ingrid Wright
(74) *Attorney, Agent, or Firm* — Hoffmann & Baron, LLP

(57) ABSTRACT

It is disclosed an apparatus comprising a casing for a portable electronic device. The casing comprises: an opening configured to accommodate a signal connector; at least one magnet configured to provide magnetic interaction; a cap configured to cover the opening in a closed position and to expose the opening in an open position; and a seal arranged to seal the opening when the cap is in a closed position. The cap is fixed to the closed position through the magnetic interaction between the casing and the cap as provided by said at least one magnet.

23 Claims, 5 Drawing Sheets

COVER MECHANISM FOR CASING

BACKGROUND

1. Field

The invention relates to the field portable electronic devices and, particularly to casings of such electronic devices.

2. Description of the Related Art

Portable electronic devices such as MP3 players, cellular phones, wrist watches, and exercise devices are typically enclosed within a casing which may be a plastic or metallic casing, for example. In order to provide the electronic device with an electric connection with other (external) devices, the casing may comprise an opening to which a connector is installed. The connector may provide an Universal Serial Bus (USB) connection, for example. The connector is electrically connected to circuits of the electronic device and, in order to protect the electronic device from moisture and such, a cover may be provided to be placed over the connector.

SUMMARY

According to an aspect of the present invention, there is provided an apparatus comprising a casing for a portable electronic device. The casing comprises: an opening configured to accommodate a signal connector; at least one magnet configured to provide magnetic interaction; a cap configured to cover the opening in a closed position and to expose the opening in an open position; and a seal arranged to seal the opening when the cap is in a closed position. The cap is fixed to the closed position through the magnetic interaction between the casing and the cap as provided by said at least one magnet.

According to an aspect of the present invention, there is provided a portable electronic device comprising said apparatus.

Embodiments of the invention are defined in the dependent claims.

BRIEF DESCRIPTION OF THE DRAWINGS

Embodiments of the present invention are described below, by way of example only, with reference to the accompanying drawings, in which.

DETAILED DESCRIPTION

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
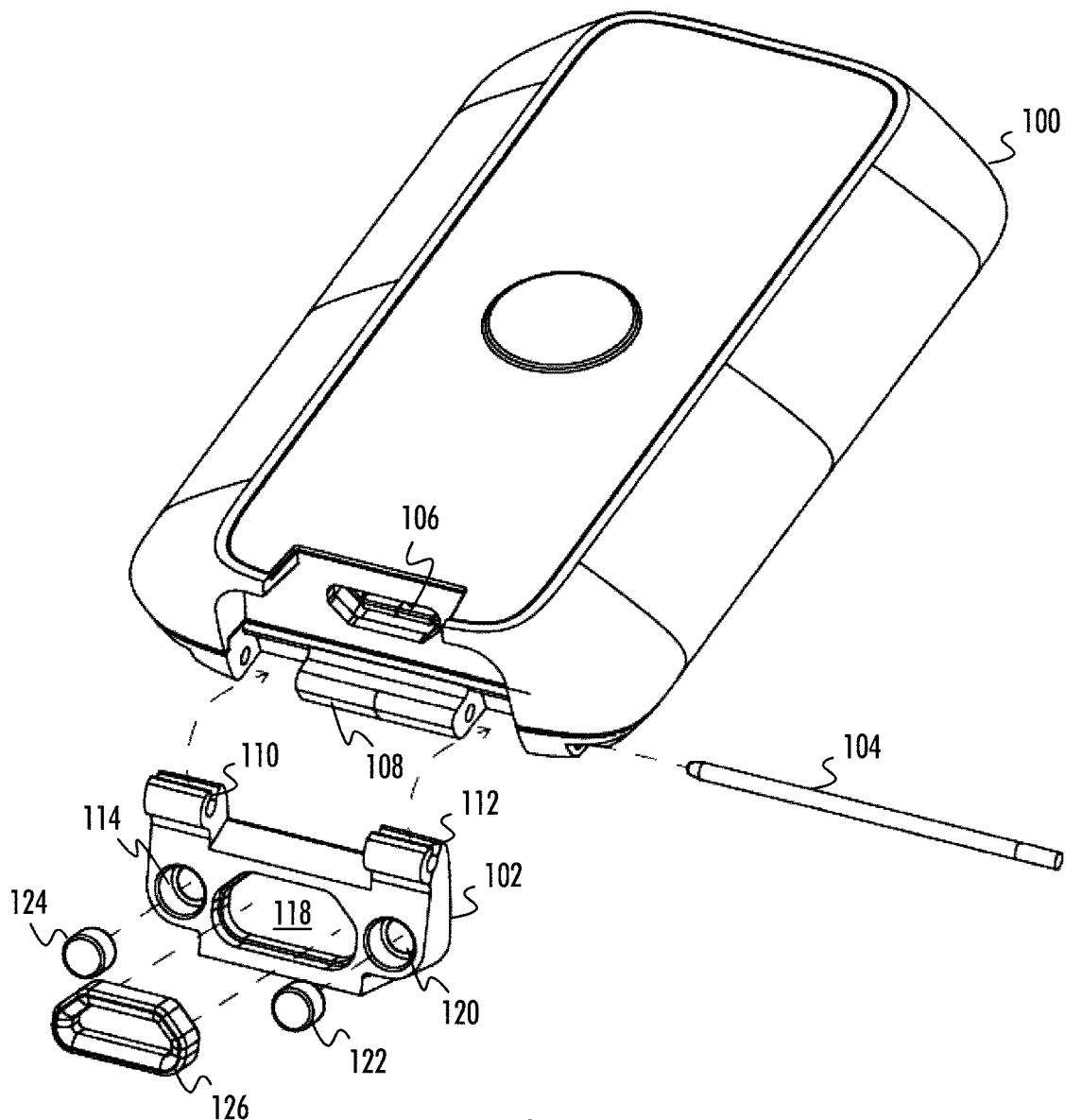
FIG. 1 illustrates an explosion view of a casing arrangement according to an embodiment of the invention.

FIG. 1 illustrates an embodiment of a casing 100 for an electronic device. The electronic device may be any portable electronic device, e.g. an MP3 player, a cellular phone, a wrist watch, or an exercise device such as a sports watch, a bike computer or a sports sensor, such as a heart rate transmitter, a foot pod, or a positioning device (a Global Positioning System receiver). It should, however, be appreciated that the electronic device may be any other portable electronic device. The casing 100 may have a flat profile, as illustrated in FIG. 1, where a top and bottom surfaces form flat surfaces, and side surfaces having smaller dimensions connect the top surface and the bottom surface. The number of side surfaces may be four, as in a conventional "matchbox" casing, but it may be envisaged that the casing has a non-rectangular shape in which case the number of side surfaces may be practically arbitrary. The side surfaces may be rounded as in FIG. 1 to provide the casing 100 with a sleek design.

The electronic device may comprise a connector for connecting the electronic device to an external device for power charging or for data transfer purposes. The connector may be a universal serial bus (USB) connector (as shown in Figures) or a power adapter connector, or it may be any other general or a proprietary connector. The connector may be an electric connector, but in some embodiments the connector may be an optical connector providing the electronic device with an optical connection with the external apparatus. The casing 100 may comprise an opening or a hole 106 for the connector. The opening 106 and the connector together provide an access to the interior of the casing 100, which may make the electronic circuits inside the casing 100 susceptible to moisture, for example. In order to protect the electronic circuits inside the casing 100, the opening 106 may be covered by a cap 102. The cap 102 may be opened to connect the electronic device to the external apparatus for charging and/or for data transfer.

Let us now consider the structure of the casing 100 and the cap 102 and their interaction in greater detail with reference to FIG. 1. The connector and the opening 106 may be provided on a side surface of the casing 100, and the cap 102 may be arranged to cover the opening 106 and/or form at least part of the side surface when the cap 102 is in a closed position. On the other hand, when the cap 102 is in an open position, the opening 106 may be exposed so as to provide access to the connector. In an embodiment, the opening is provided in a recession formed to the casing 100, and the cap 102 is formed as a counterpart of the recession, thereby covering and filling the recession in the closed position.

Figure 2:
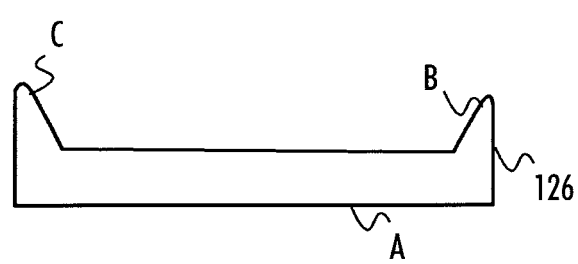
FIG. 2 illustrates a cross-section of a seal for use in the casing arrangement of FIG. 1.

The cap 102 may comprise a seal 126 disposed in the cap 102 in such manner that when the cap 102 is in the closed position, the seal 126 covers the opening 106 so as to prevent moisture from accessing the electronic circuits inside the casing 100. The seal 126 may connect to the casing 100 around the opening 106, thereby encircling the opening 106, and/or the seal 126 may at least partially fill the opening 106 when the cap 102 is closed. Accordingly, the dimensions of the seal 126 may be slightly smaller than the dimensions of the opening 106 to allow the seal 126 to at least partially penetrate the opening 106 when the cap 102 is closed. The shape of perimeters of the seal 126 may follow the shape of the opening 106. The dimensions of the seal 126 may increase gradually towards the base of the seal 126 (towards the cap 102) such that the seal both penetrates the opening 106 and surrounds the opening 106. The seal 126 may be dimensioned to contact the surface of the casing 100 as close to the opening 106 as possible. As a consequence, the contact area between the seal 126 and the casing 100 is a small as possible and, therefore, minimal strength is needed to press the seal 126 to the casing 100 to have the sealing effect. The needed pressure may also be affected by the selection of the material of the seal 126. The cap 102 may comprise a recession 118 on its inner surface to accommodate the seal 126. The recession 118 may follow the shape of the seal 126 and, thus, it may fix the seal 126 to an appropriate location by its form, thereby preventing the seal from slipping sideways along the inner surface of the cap 102. FIG. 2 illustrates an embodiment of a cross-section of the seal 126 illustrated also in FIG. 1. The cross-section of the seal 126 may be cup-like, wherein a flat bottom surface A is designed to contact the cap 102 in the recession 118, while a ring-shaped top side denoted by B and C are designed to encircle the opening 106 when the cap 102 is closed. The cup-like structure of the seal 126 ensures that even if an edge of the seal 126 is detached from the cap 102, the opening 106 remains protected, which is not the case with conventional O-ring seals. However, in some embodiments, the seal 126 may be an O-ring. The material of the seal 126 may be any material suitable for sealing purposes, e.g. elastic material such as rubber, silicon or polymer. In other embodiments, the seal 126 is attached to the casing 100 around the opening 106, and the seal 126 may in such embodiments be the O-ring.

The cap 102 may be attached to the casing 100 in a fixed or detachable manner. FIG. 1 illustrates an embodiment where the cap 102 is attached to the casing 100 by a hinge mechanism to allow the cap 102 to move between the open and the closed position. The hinge mechanism comprises a pivot or an axle 104 which is inserted through one or more holes provided in the casing 100, as illustrated in FIG. 1. In FIG. 1, the casing 100 comprises holes on edges of the recession to allow the pivot the pass through the recession along the side surface on which the recession is located. In order to support the pivot 104, a protrusion 108 comprising a through hole for the pivot 104 may be provided in the recession. Accordingly, the through hole of the protrusion 108 may be aligned with the holes in the casing 100 on both sides of the protrusion along the line through which the pivot 104 is inserted. The pivot 104 or the holes in the casing and/or in the protrusion may comprise a locking mechanism for the pivot 104 such that the pivot 104 does not slip out of the hole. The locking mechanism may be based on grip, or a spline may be used to fix the pivot 104. While the embodiments described herein utilize the pivot, it should be understood that other mechanisms allowing the cap to swivel between the closed and open position. The pivot-based hinge mechanism may be replaced by an elastic structure attaching the cap 102 to the casing 100 and allowing the cap 102 to swivel.

When the pivot 104 is inserted to its location in the casing 100 through the appropriate holes in the casing, at least one portion of the pivot 104 may be exposed such that the cap 102 may be attached to the exposed portion(s) of the pivot 104. FIG. 1 illustrates an embodiment where two portions of the pivot 104 are exposed when the pivot is in its place, and the cap may be arranged to contact with those two portions (see dashed arrows). The cap may comprise grip elements 110, 112 arranged to contact with the pivot 104 and partially surround the pivot 104 such that they mechanically attach the cap 102 to the pivot 104. The grip elements 110, 112 may be closed and comprise through holes such that the cap is inserted into its location with respect to the casing before the pivot is inserted through the holes in the casing 100 and the holes in the grip elements 110, 112 of the cap 102. However, in other embodiments, the grip elements are partially open such that the pivot 104 may be inserted to the casing beforehand and, thereafter, the cap 102 may be coupled to the pivot 104. In such embodiments, the holes in the grip elements 110, 112 may still exist and have the same or a slightly greater diameter than the diameter of the pivot 104. However, the grip elements 110, 112 comprise openings dimensioned to be slightly smaller than the diameter of the pivot 104 allowing the cap 102 to be coupled with the pivot 104 by pressing the openings towards the exposed portions of the pivot 104 such that the grip elements of the cap 102 snap around the pivot 104, thereby gripping the pivot. The material of the grip elements 110, 112 may be rigid but slightly elastic to enable the grip elements to bend slightly upon pressure but maintain their form so as to prevent the cap 102 from detaching from the pivot 104 easily. Making the grip elements 110, 112 open enables that the cap 102 is detached from the casing 100 when force is applied to the cap 102. Thus, the cap 102 or the casing 100 does not break if excessive force is accidentally applied to it.

When the cap 102 is coupled with the casing through the hinge mechanism or other contact mechanism, the cap 102 is in some embodiments arranged to rotate freely about the pivot in the open position. The hinge mechanism may be provided without a return mechanism which forces the cap 102 towards the closed position, e.g. a spring or another elastic member that prevents or disturbs the free motion of the cap 102 in the open position.

In order to fix the cap to the closed position, a magnetic fixing arrangement may be provided, wherein the magnetic fixing arrangement is arranged to cause magnetic interaction between the cap 102 and the casing 100, thus attracting the cap 102 towards the casing 100. When the cap 102 is in contact with the casing 100, the magnetic force fixes the cap 102 to the casing 100, whereby the seal 126 covers and seals the opening 106. The magnetic fixing arrangement may be realized by attaching at least one magnet to the cap 102 (as illustrated in FIG. 1 by two magnets 122, 124) or to the casing. A counterpart for the magnet in a corresponding location in the casing 100 (or in the cap 102) may be realized by a magnet of opposite polarity or by ferrite material which is not inherently magnetic but that is made magnetic upon experiencing magnetic interaction. In the embodiment of FIG. 1, the cap 102 comprises recessions 114, 120 for accommodating the magnets 122, 124. The magnetic fixing arrangement 122, 124 may be provided on an opposite edge of the cap 102 with respect to the hinge mechanism to enable that the cap 102 is firmly fixed to the casing 100 in the closed position (by the hinge and by the magnet).

As indicated above, the magnetic fixing arrangement may be realized by providing magnetic pairs in the cap 102 and in the casing 100, wherein each magnetic pair comprises at least one magnet and at least one magnetic counterpart member. The magnetic counterpart member may be a magnet with an opposite polarity or simply ferrite (ferromagnetic) material. The ferromagnetic material may be realized by a ferromagnetic member, e.g. stud. The members of the magnetic pair may be provided in different mechanic parts between which the magnetic fixing is needed, e.g. the magnet may be provided in the casing 100 while the counterpart member may be provided in the cap 102 (or vice versa). Obviously, multiple magnetic pairs may be provided between the cap 102 and the casing 100, and each may be designed separately, e.g. one magnetic pair may comprise the magnet only in the casing 100, while another magnetic pair comprises the magnet only in the cap 102. In some embodiments, the cap 102 is made of a ferromagnetic material in which case the whole cap 102 form a part of a magnetic pair. The casing 100 may then comprise at least one magnet to carry out the magnetic interaction. In other embodiments, the casing is made of the ferromagnetic material at least in the contact area where the cap 102 contacts with the casing 100 to carry out the same effect.

The magnetic pair may also be configured to position or center the cap 102 to the casing. In other words, the magnets may be designed such that the magnetic attraction of the magnetic pair ensures that the cap 102 is guided to an appropriate location with respect to the casing 100 when the cap is closed 102. This may be carried out by selecting the magnetic parts to be sufficiently small with respect to the size of the cap 102. The dimensions of the magnetic parts 122, 124 may be less than a half of the corresponding dimensions of the cap 102 or the contact area in the casing 100. In some embodiments, the dimensions of the magnetic parts 122, 124 are less than 25% of the dimensions of the cap 102 in the direction where the positioning is affected. The positioning may be effected horizontally and/or vertically with respect to the surface where the cap 102 is positioned. The positioning of the cap 102 with respect to the casing 100 may naturally be affected by other guiding members in other embodiments, e.g. through the hinge mechanism.

The magnets 122, 124 may be fixed to the casing 100 and/or the cap 102 by mechanic fixing members or by adhesive, e.g. by glue.

When a force higher than the magnetic force is applied to the cap 102 into the direction away from the casing 100, the cap 102 is forced into the open position. Inherently, the magnetic force attenuates rapidly in proportion with the distance between the magnetic pieces. Therefore, the magnetic strength of the magnet(s) 122, 124 may be designed such that the magnetic force fixes the cap 102 to the casing 100, thus sealing the opening 106, when the cap 102 is moved into the closed position. However, the magnetic strength may be selected to be so weak that it does not force the cap 102 to close when the magnetic portion of the cap 102 is sufficiently far away from the magnetic portion of the casing 100 in the open position, e.g. more than a few millimeters (5 mm) away. An advantage when using the magnetic fixing instead of a mechanic fixing, for example, is that the magnetic fixing is mare durable. The mechanic fixing may deteriorate as a result of wearing or mechanic breaking. However, magnetic fixing does not have such problems. As the magnetic force penetrates almost any material, the magnets may also be covered by the surface of the casing 100 and/or the cap 102. As a consequence, the magnets are not exposed which allows for a smoother surface in the cap 102 and/or in the casing 100 and protection for the magnetic fixing arrangement. In some embodiments, the magnet(s) is/are on an inner surface of the casing 100, while in other embodiments, the magnet(s) is/are molded inside the casing 100 and/or the cap 102.

Figure 3:
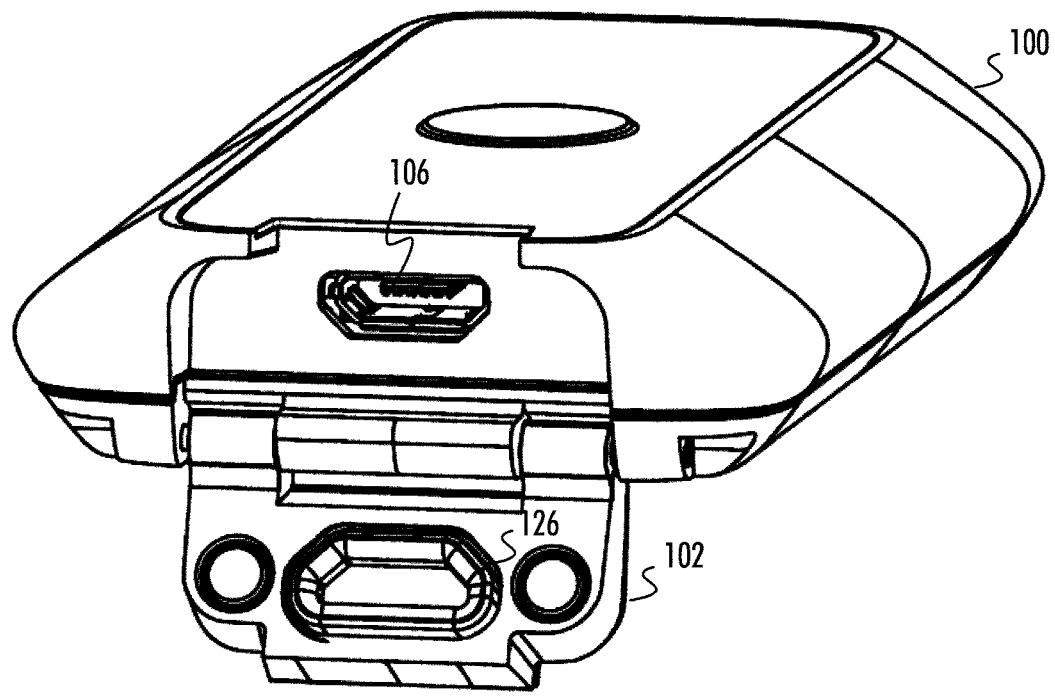
FIGS. 3 and 4 illustrate the casing of FIG. 1 when a cap is attached to the casing and when the cap is in an open position.
Figure 4:
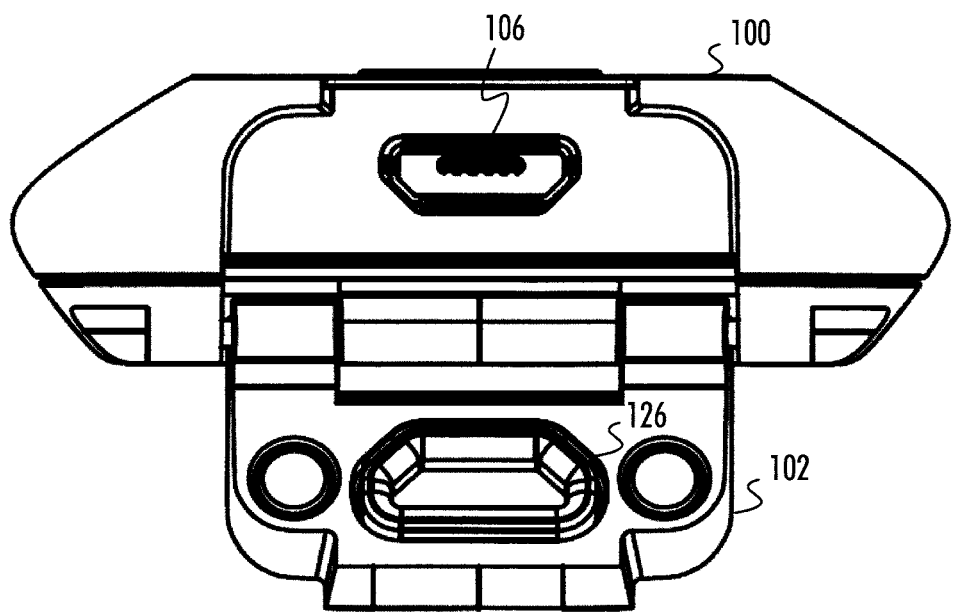

FIGS. 3 and 4 illustrate the casing 100 of FIG. 1 when the cap 102 is attached to the casing and in the open position. FIG. 3 provides a perspective view of the casing 100, while FIG. 4 illustrates a side view from the side where the cap 102 and the opening 106 are located. FIGS. 3 and 4 also illustrate how the cap 102 is allowed to swivel about the pivot and how the seal 126 covers the opening 106 when the magnets provided in the cap 102 on both sides of the seal 126 are cause the magnetic interaction with the counterparts in the casing 100, thus closing the cap 102.

Figure 5:
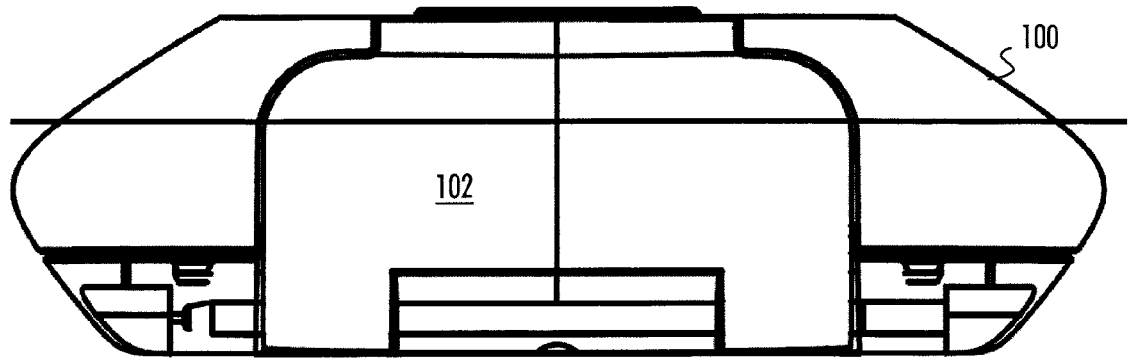
FIGS. 5 and 6 illustrate the casing of FIG. 1 when the cap is attached to the casing and when the cap is in a closed position.
Figure 6:
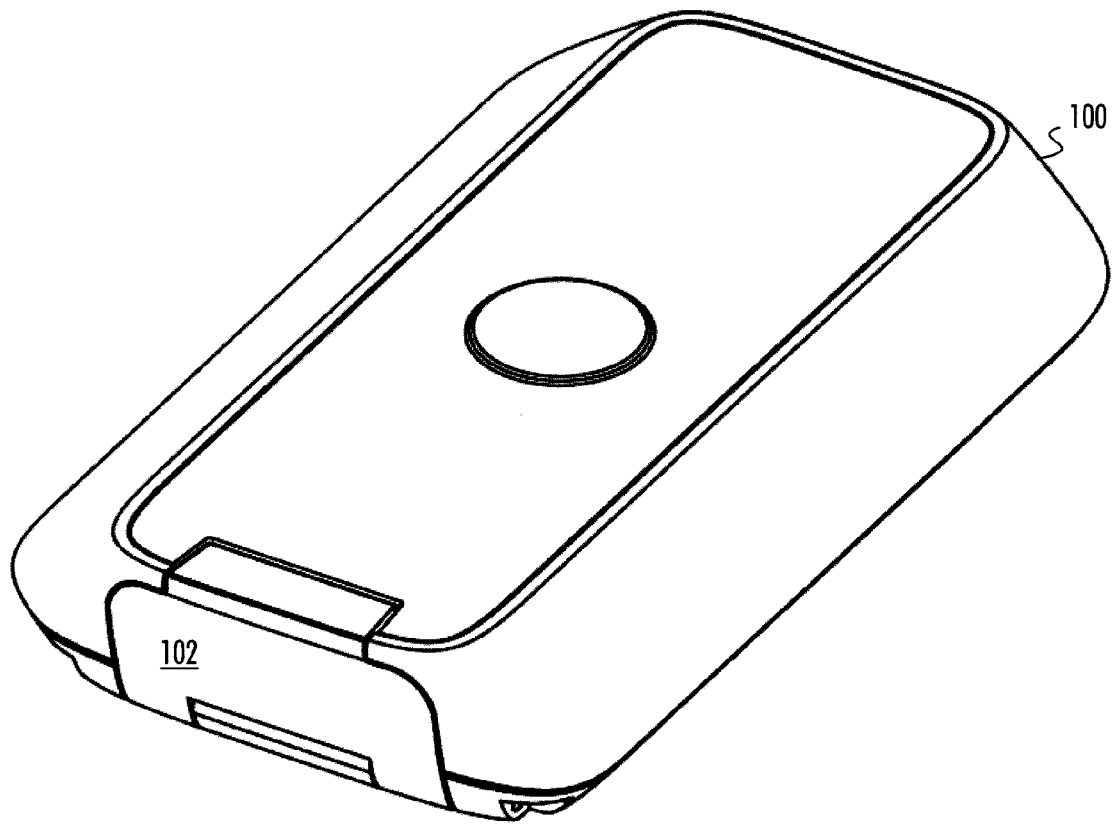

FIGS. 5 and 6 illustrate the cap 102 as attached to the casing 100 and in the closed position. As can be seen from FIGS. 5 and 6, the outer surface of the cap 102 has been designed to follow the shape of the casing 100 around the location of the cap 102. In other words, the shape of the outer surface of the cap 102 is uniform with the shape of the casing 100 around the recession (or the location of the cap 102). When the cap 102 is in the closed position, the cap does not form any recession or protrusion with respect to the casing but, instead, forms a smooth and planar surface together with the side surface of the casing 100 where the cap 102 is located. In some embodiments, the cap 102 is designed to provide together with the casing 100 a nearly seamless surface. In the embodiments illustrated herein, the cap 102 forms a part of the side surface of the casing 100, i.e. it does not cover the whole side surface, while in other embodiments the 102 cap covers the whole side surface of the casing 100. In other embodiments, the cap 102 may be located on the top or bottom surface of the casing 100, depending on the designed location of the opening 106 that needs to be covered and sealed by the cap 102.

Figure 7:
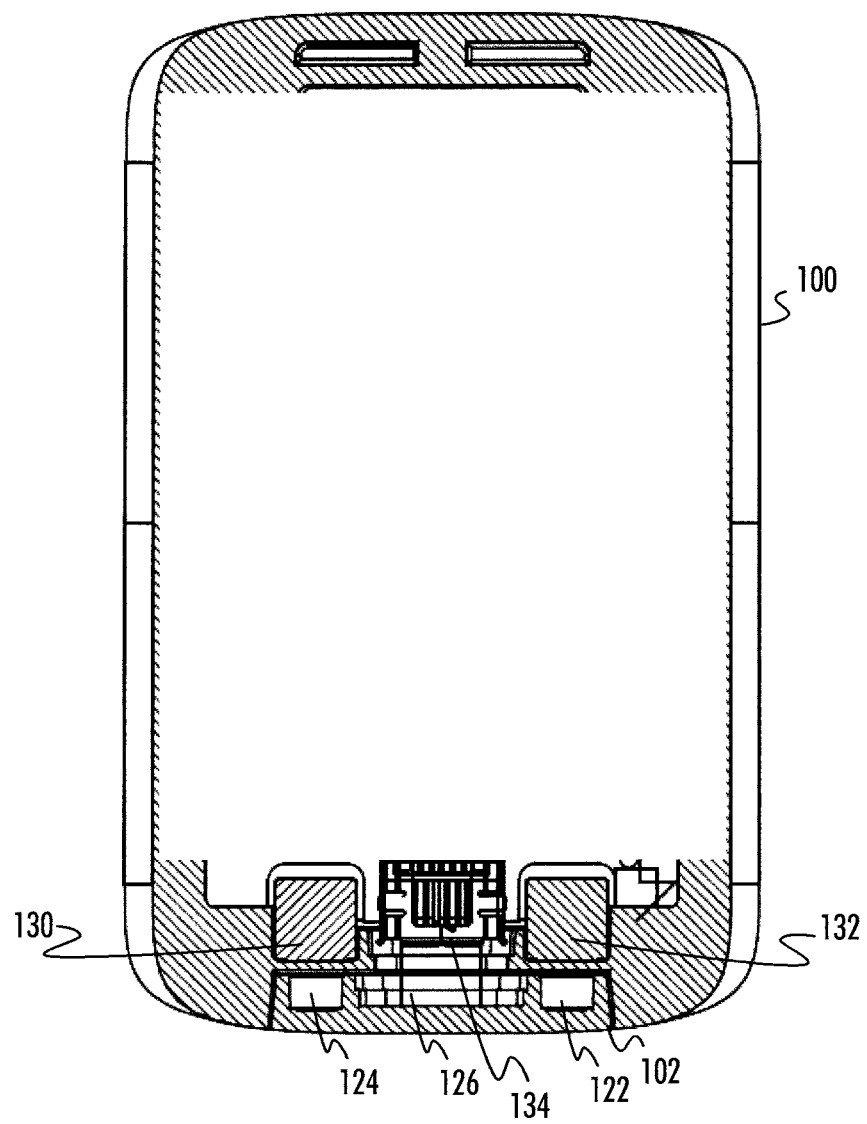
FIG. 7 illustrates the casing of FIG. 1 with an electronic circuitry provided inside the casing, when the cap is closed

FIG. 7 illustrates yet another view of the casing 100 when the cap 102 is in the closed position. FIG. 7 illustrates also the circuitries inside the casing 100 and a mini USB connector 134 that arranged in the opening 106. FIG. 7 also shows how the seal 126 covers the opening 106 by contacting the casing 100 around the opening 106 and partially entering the opening to provide even better sealing effect. FIG. 7 also illustrates how the sealing effect provided by the cup-shaped seal 126 is maintained even if the seal 126 is loose from the cap 102 to some degree. The moisture may enter the space between the cap 102 and the seal 126, but it cannot penetrate the seal 126 and access the inside of the casing 100 through the opening 106. FIG. 7 further illustrates how the location of the magnets 122, 124 in the cap 102 and the counterpart elements 130, 132 (either magnets of opposite polarity or ferrite material) in the casing or in the circuitry on both sides of the opening 106.

Figure 8:
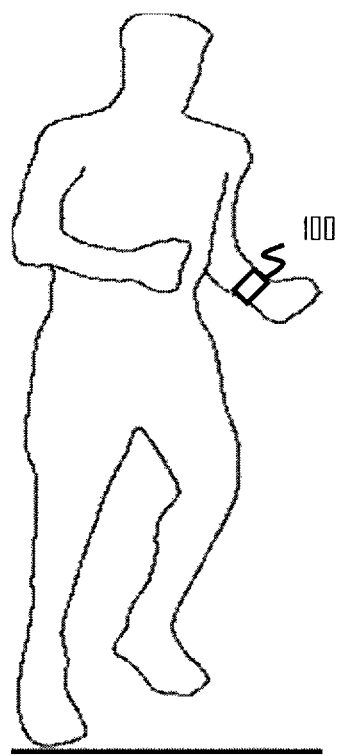
FIG. 8 illustrates a wrist watch device having a casing according to the casing arrangement of FIG. 1.

The present invention is applicable to portable electronic devices defined above but also to other systems. For example, the casing and the cap according to other embodiments may be provided in a wrist device that may be a wrist watch type of apparatus. FIG. 8 illustrates the casing 100 provided in a wrist device. In such embodiments, the cap may be provided on a side surface of the wrist device or even on the top or bottom surface of the wrist device. It will be obvious to a person skilled in the art that, as technology advances, the inventive concept can be implemented in various ways. The invention and its embodiments are not limited to the examples described above but may vary within the scope of the claims.

What is claimed is:

1. A portable electronic apparatus comprising:
  a casing for a portable electronic device, the casing comprising an opening configured to accommodate a signal connector;
  at least one magnet configured to provide magnetic interaction;
  a cap configured to cover the opening in a closed position and to expose the opening in an open position; and
  a seal arranged to enter and seal the opening when the cap is in a closed position,
  wherein the cap is fixed to the closed position through the magnetic interaction between the casing and the cap as provided by said at least one magnet,
  the seal including a cup-like cross-section, a flat bottom of the cup-like cross-section being attached to the cap, a ring-shaped top side of the cup-like cross-section being arranged to contact the casing around the opening when the cap is in the closed position, the seal covering the opening, thereby preventing entry of moisture into the opening even if the seal is loose from the cap.

2. The apparatus of claim 1, wherein the casing comprises a recession in an outer surface of the casing, wherein the opening is arranged in the recession, and wherein the cap is arranged to cover the recession.

3. The apparatus of claim 2, wherein the cap covers the recession completely in the closed position, and wherein a shape of an outer surface of the cap is uniform with the shape of the casing around the recession.

4. The apparatus of claim 1, wherein the seal is pressed between the cap and the casing by the magnetic interaction when the cap is in the closed position.

5. The apparatus of claim 1, wherein a surface of the seal that contacts the casing when the cap is closed has dimensions that are smaller than the dimensions of the opening, thereby allowing the seal to partially enter the opening when the cap is closed, and wherein the dimensions of the seal increase gradually towards the cap to allow the seal to contact the casing around the opening when the cap is closed.

6. The apparatus of claim 1, wherein the cap comprises a recession to accommodate the flat bottom of the seal.

7. The apparatus of claim 1, further comprising a hinge, wherein the cap is configured to swivel about the hinge between the open position and the closed position.

8. The apparatus of claim 7, wherein the hinge comprises a pivot, and wherein the cap is detachably connected to the pivot.

9. The apparatus of claim 8, wherein the cap comprises at least one grip element arranged to contact with the pivot and partially surround the pivot so as to provide a mechanical attachment between the cap and the pivot while allowing the cap to swivel freely about the pivot.

10. The apparatus of claim 7, wherein the cap is configured to swivel freely about the hinge when the cap is in the open position.

11. The apparatus of claim 10, wherein the signal connector is an electric signal connector.

12. The apparatus of claim 1, wherein the magnetic interaction is provided by at least one magnetic pair comprising said magnet and a magnetic counterpart member, wherein one of said magnet and the counterpart member of a magnetic is provided in the cap while the other one of said magnet and the counterpart member of the magnetic is provided in the casing.

13. The apparatus of claim 12, wherein at least one magnet or at least one counterpart member is covered by a surface of the cap or the casing.

14. The apparatus of claim 1, further comprising at least one electronic circuitry in the casing, wherein said signal connector disposed in the opening is connected to said at least one electronic circuitry.

15. The apparatus of claim 1, wherein the apparatus is a sports watch.

16. The apparatus of claim 1, wherein the apparatus is a sports sensor.

17. The apparatus of claim 1, wherein the apparatus is a bike computer.

18. The apparatus of claim 1, wherein the location of the at least magnet is arranged to position the cap with respect to the casing through the magnetic interaction.

19. An electronic wrist device comprising:
a casing for an electronic circuitry of the wrist device, the casing comprising an opening configured to accommodate a signal connector, wherein the opening is provided in a recession at a bottom surface of the casing;
a cap configured to cover the recession and the opening completely in a closed position and to expose the recession and the opening in an open position, wherein a shape of an outer surface of the cap is uniform with the shape of the casing around the recession;
at least one magnet configured to provide magnetic interaction to fix the cap to the closed position through the magnetic interaction between the casing and the cap as provided by said at least one magnet; and
a seal arranged to enter and seal the opening when the cap is in the closed position, the seal including a cup-like cross-section, a flat bottom of the cup-like cross-section being attached to the cap, a ring-shaped top side of the cup-like cross-section being arranged to contact the casing around the opening when the cap is in the closed position, the seal covering the opening, thereby preventing entry of moisture into the opening even if the seal is loose from the cap.

20. The wrist device of claim 19, wherein the cap forms a planar surface together with the bottom surface of the casing where the cap is located.

21. The wrist device of claim 19, wherein the seal has a cup-like cross-section, wherein a flat bottom of the cup-like cross-section is attached to the cap, and wherein a ring-shaped top side of the cup-like cross-section is arranged to contact the casing around the opening when the cap is in the closed position.

22. The wrist device of claim 19, wherein a top surface and said bottom surface form flat surfaces, and wherein side surfaces having smaller dimensions than the top surface and the bottom surface connect the top surface and the bottom surface.

23. The wrist device of claim 19, wherein magnetic force of the at least one magnet fixes the cap to the casing, thus sealing the opening when the cap is in the closed position.

* * * * *